Jan. 31, 1928. 1,657,711
M. F. COOLBAUGH ET AL
PROCESS OF DESULPHIDIZING AND DESULPHURIZING SULPHUR MINERALS
Filed Aug. 4, 1922
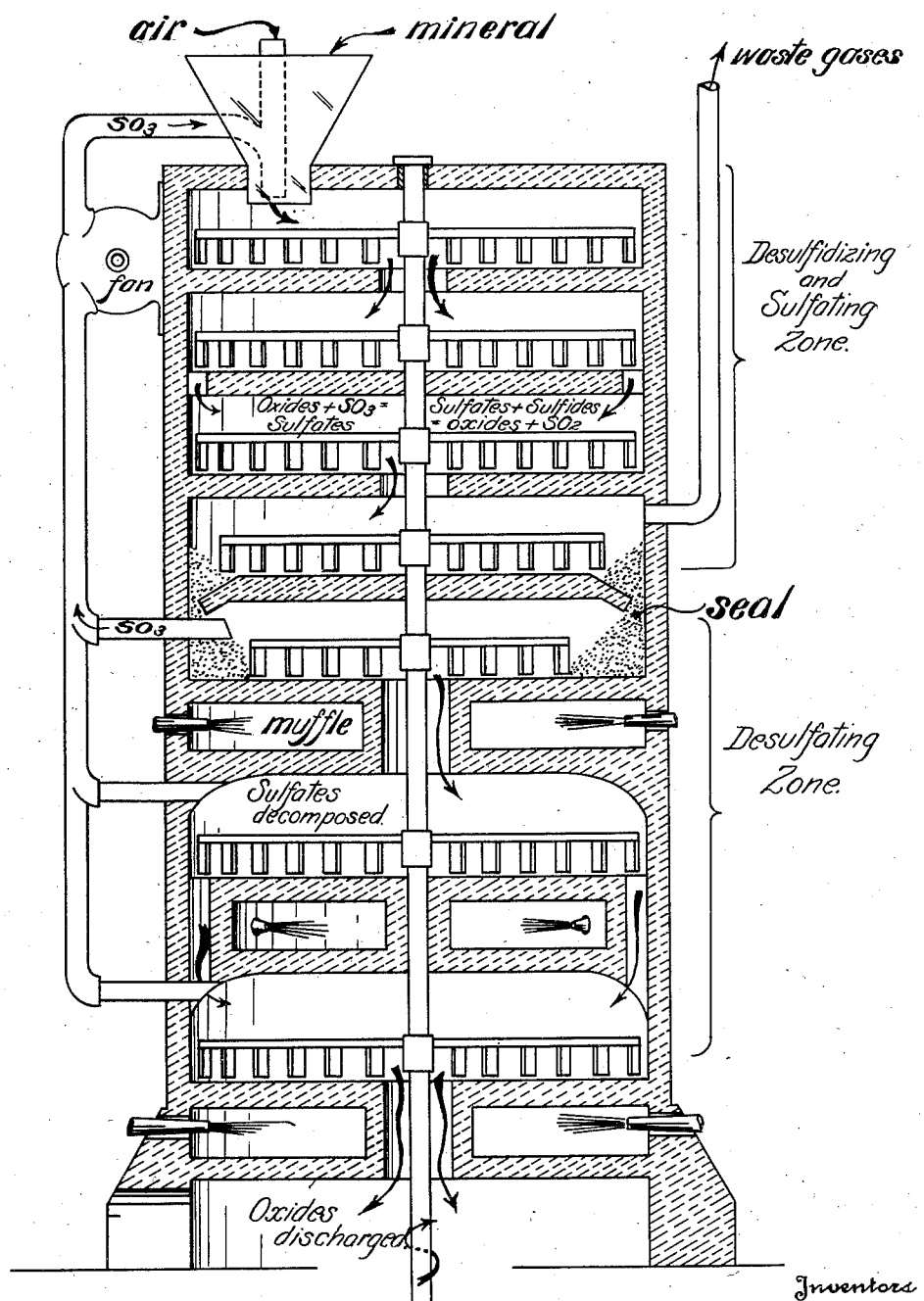
Inventors
M. F. Coolbaugh and
J. B. Read.
By Lynn L. Steele
Attorney.

Patented Jan. 31, 1928.

1,657,711

UNITED STATES PATENT OFFICE.

MELVILLE FULLER COOLBAUGH AND JOHN BURNS READ, OF GOLDEN, COLORADO, ASSIGNORS TO THE COMPLEX ORES RECOVERIES COMPANY, OF DENVER, COLORADO, A CORPORATION OF COLORADO.

PROCESS OF DESULPHIDIZING AND DESULPHURIZING SULPHUR MINERALS.

Application filed August 4, 1922. Serial No. 579,714.

The object of this invention is to provide a more rapid and efficient method for the elimination of sulphur from sulphur bearing minerals. This is accomplished by roasting sulphide minerals under conditions which will form appreciable quantities of sulphates, and other highly oxidized compounds, which in turn carry oxygen into the bed and rapidly oxidize the remainder of the sulphide.

The usual practice heretofore for the elimination of sulphur from a sulphide mineral has been to roast the mineral with an excess of air forming oxides of the metals directly and liberating sulphur dioxide gas. In this operation the sulphide mineral and air for oxidation are caused to travel counter-currently in which case only a small quantity of sulphates form, and these form only after the greater part of the sulphide sulphur has been eliminated. In order to decompose the sulphates it has been necessary to heat to a high temperature with or without the addition of carbonaceous matter.

Our invention causes the desulphidizing of sulphide minerals to be effected by the formation of sulphates in the presence of sulphides, and these two compounds when brought to the right temperature conditions interact to form metal oxides and sulphur dioxide.

This process is carried on as follows: The mineral to be desulphidized is fed into the top of a roasting furnace, which may be of the type indicated in the accompanying drawing, wherein the process as a whole is diagrammatically illustrated. By preference this furnace is one of the mechanically operated superimposed hearth types, although other types may be used if desired. The air for oxidation is added with the mineral and both travel together continuously in the same direction, that is, concurrently, throughout the desulphidizing zone. The temperatures on the first hearths will be low, ranging from 350-500 degrees C. but will rise on the succeeding hearths as the desulphidizing progresses until a maximum of about 900° C. is attained. During this progress through the furnace sulphates will form in the upper cooler zone in the presence of sulphides which are being reacted upon to form metal oxides and sulphur dioxide by the action of the air. As the sulphates and sulphides travel together into the hotter zone an interaction takes place between them, whereby oxides and sulphur dioxide are formed. If the proportion of sulphates to sulphides could be closely regulated in the above operation, the calcine could be completely roasted to an oxide and discharged from the furnace, when this reaction is completed. Usually, however, the sulphate will predominate at the completion of the desulphidizing reaction, so that further means must be employed to decompose such sulphates if a completely desulphurized product is desired. The decomposition of the sulphate is readily effected by passing the ore from the desulphidizing zone into a lower part of the furnace separated by a seal which may be formed by ore or other means. In the lower part of the furnace the temperature may be maintained by muffles and the gases taken away from each hearth as rapidly as possible, which is the condition most favorable for decomposing sulphates. If desired, regulated quantities of sulphides may be added to decompose the excess of sulphates by the same chemical reaction as is involved in the desulphidizing zone. The gas from the desulphatizing zone which will be highly concentrated in sulphur dioxide and sulphur trioxide may be returned to the top of the furnace to be mixed with ore and thus aid in the formation of sulphates which are highly desirable for this zone.

From the above description it is plain that the desulphidizing of a sulphide mineral is accomplished by causing sulphates to form in the presence of sulphides, and then causing the sulphates which are strongly oxidizing to react with the sulphides which are strongly reducing and form oxides and sulphur dioxide. The formation of the sulphates is accomplished by maintaining a high concentration of sulphur gases at regulated temperatures for an appreciable time in contact with the material to be sulphatized. This is effected by moving the minerals and gases rich in oxids of sulphur in the same direction in the desulphidizing zone. The excess of sulphates formed in the desulphidizing zone is decomposed by heating in a zone where the gases are removed from the field of action as rapidly as possible and where a regulated quantity of a sulphide mineral may be added to complete the reduction of the sulphate.

In order that the economics of the process may be clearly understood, the details and chemistry of the various stages thereof will be traced, selecting zinc particularly to illustrate the reactions, having in mind that other metals such as copper and lead have similar reactions. Zinc sulphide, with any accompanying iron sulphide, charged into the furnace together with air for oxidation, will form at 350° C.–500° C. ferric oxide and sulphur dioxide as follows:

$$2FeS_2 + 11O = Fe_2O_3 + 4SO_2$$

The ferric oxide thus formed has a marked catalytic action upon $SO_2$ and oxygen to form $SO_3$. Some ferric and ferrous sulphates may be formed simultaneously with the ferric oxide. Zinc sulphide does not oxidize as readily as iron sulphide, but some zinc oxide will form during oxidation of the iron $$ZnS + 3O = ZnO + SO_2$$

Zinc oxide will react with sulphur trioxide to form zinc sulphate.

$$ZnO + SO_3 = ZnSO_4$$

At higher temperatures, above 525° C. zinc sulphate reacts with the remaining zinc sulphate as follows:

$$ZnS + 3ZnSO_4 = 4ZnO + 4SO_2$$

Any zinc sulphate in excess of the above equation is decomposed under the influence of heat by removing the sulphur gases as rapidly as possible and by introducing a regulated quantity of sulphide mineral to reduce such excess of sulphate.

This process reveals a means whereby a sulphide mineral can be desulphidized very rapidly, producing an oxide as the final product. The rapidity of the reaction will assure greater tonnage per furnace than is now roasted, which in turn will give a higher temperature which is favorable for the completion of the roast.

The process is especially adopted to the roasting of zinc sulphide concentrates preliminary to the production of metal zinc in the retort, and also the production of zinc oxide on the Wetherill grate. The requirements for these two operations are that the calcine should contain a minimum quantity of sulphur and that the roasting should be performed at a minimum expense. By employing the principle of oxidation by means of a sulphate both requirements are met.

We claim:

1. A process of desulphurizing metalliferous sulphide material in a multi-stage roasting operation which comprises first subjecting the material to a sulphatizing roast in an atmosphere containing an excess of sulphur trioxid while carrying the material to a temperature at which sulphates would decompose if in an atmosphere devoid of sulphur trioxid, conducting gases containing sulphur trioxid and free oxygen in concurrent contact with the sulphide material under treatment during such step; withdrawing the sulphatized material from contact with sulphatizing conditions and heating the same while rapidly withdrawing the gases containing sulphur trioxid from contact with the heated material, to allow desulphatizing to be conducted rapidly; and introducing the gases evolved in the last mentioned step with air into the sulphatizing zone.

2. A process of desulphidizing sulphide material which comprises the step of subjecting the material to a sulphatizing roast in an atmosphere containing an excess of sulphur trioxid while carrying the material to a temperature at which sulphates would decompose if in an atmosphere devoid of sulphur trioxid, conducting gases, produced extraneously to such step, which gases contain sulphur trioxid and free oxygen, in concurrent contact with the sulphide material under treatment during such step, to form metallic oxides and sulphur gases by reaction of the sulphides and produced sulphates.

3. A process for desulphidizing sulphide minerals comprising roasting the same with metallic sulphates and moving the minerals and gases containing $SO_3$ in excess concurrently during the roast and thereafter further roasting the said materials, with the $SO_3$ kept as low as possible to permit of the formation of oxide.

4. A process of desulphurizing metalliferous sulphide material in a multi-stage roasting operation which comprises first subjecting sulphic material containing iron and other metal sulphides to a sulphatizing roast in an atmosphere containing an excess of sulphur trioxid while carrying the material to a temperature at which sulphates would decompose if in an atmosphere devoid of sulphur trioxid, the iron oxid formed serving as a catalyst for oxidation of $SO_2$ to $SO_3$, conducting gases containing sulphur trioxid and free oxygen in concurrent contact with the sulphide material under treatment during such step; withdrawing the sulphatized material from contact with sulphatizing conditions and heating the same while rapidly withdrawing the gases containing sulphur trioxid from contact with the heated material, to allow desulphatizing to be conducted rapidly; and introducing the gases evolved in such step with air into the sulphatizing zone.

5. A desulphidizing process for minerals comprising roasting together metallic sulphides and sulphates for the formation of oxides and sulphur gases and advancing the minerals concurrently with gases containing an excess of $SO_3$ over that generated by the roasting reaction.

6. A process of desulphurizing metal sulphide material which comprises causing the material to travel downwardly through a furnace while subjecting the same to extraneous heating, passing gases containing sulphur trioxid and free oxygen, in concurrent contact with the ore during the first stage of the said furnace treatment, continuing the heating of the sulphatized material while passing through the later stage of the process, while rapidly withdrawing the evolved gases containing sulphur trioxid from said later stage of the process, causing the sulphatized material to form a gas seal between the first stage and the later stage of the treatment, withdrawing the gases from said first stage at above said seal, and conducting the gases evolved in the second stage into the first stage for utilization as a sulphatizing agent therein.

7. A process for desulphidizing sulphide minerals comprising roasting the same with air and under conditions favorable to the efficient formation of metallic sulphates, and advancing the materials and gases concurrently during the roast and thereafter heating the sulphatized material while rapidly leading away the sulphur trioxid formed.

8. A process for desulphidizing sulphide minerals containing iron comprising roasting the same for the formation of metallic oxides and sulphur oxides under conditions favorable to the efficient formation of metallic sulphates, and advancing the minerals and gases concurrently, and thereafter heating the sulphatized material while rapidly leading away the sulphur trioxid formed.

9. A process for desulphidizing sulphide minerals containing iron comprising roasting the same for the formation of metallic oxides and sulphur oxides under conditions favorable to the efficient formation of metallic sulphates, maintaining $SO_3$ concentration in the gases high enough to insure against substantial decomposition of the sulphates desired, and advancing the materials and gases concurrently and thereafter further roasting the said materials, with the $SO_3$ kept as low as possible to permit of the formation of oxides.

10. A process of desulphurizing metal sulphide material which comprises causing the material to travel through a furnace while agitating the same and while subjecting the same to extraneous heating, passing gases containing sulphur trioxid and free oxygen, in concurrent contact with the ore during the first stage of the said furnace treatment, continuing the heating of the sulphatized material while passing through the later stage of the process, while rapidly withdrawing the evolved gases containing sulphur trioxid from said later stage of the process, maintaining a gas seal between the first stage and the later stage of the treatment, withdrawing the gases from said first stage in advance of said seal, and conducting the gases evolved in the second stage into the first stage for utilization as a sulphatizing agent therein.

11. A process for desulphidizing sulphide minerals comprising roasting the same for formation of metallic oxides and sulphur oxides under conditions favorable to the efficient formation of metallic sulphates and reaction of said sulphates with sulphide particles to oxidize the latter, maintaining $SO_3$ concentration in the gases high enough to insure against decomposition of the sulphates during said reaction, and then lowering said $SO_3$ concentration for the ready decomposition of the sulphates and formation of oxides therefrom.

12. A process for desulphidizing sulphide minerals comprising roasting the same for formation of metallic oxides and sulphur oxides under conditions favorable to the efficient formation of metallic sulphates and reaction of said sulphates with sulphide particles to oxidize the latter, maintaining $SO_3$ concentration in the gases high enough to insure against decomposition of the sulphates during said reaction, and separating the minerals from said gases for decomposition of the sulphates in an atmosphere of low $SO_3$ content, and maintaining said $SO_3$ content low in the atmosphere surrounding such materials during desulphatizing.

13. A process for desulphurizing sulphide minerals comprising roasting the same for the formation of oxides of the metals present and of sulphur, advancing the minerals and liberated gases together under conditions favorable to the efficient formation of metallic sulphates whereby the sulphates react with the sulphides to form oxides of the metals, and in an atmosphere of high sulphur trioxide content, removing the minerals from said trioxide gases and holding them in a second zone at a temperature adapted for the decomposition of sulphates to form oxides of the metals, and removing the $SO_3$ gases from said second zone and introducing the same into the roasting zone for ready formation of sulphates in said roasting zone from sulphides and oxides therein.

14. A process for treating sulphide minerals containing iron comprising roasting the same with air for the formation of metallic oxides including ferric oxide and sulphur oxides, whereby the ferric oxide acts catalytically to form $SO_3$ from the liberated $SO_2$ and oxygen of the air, whereby the $SO_3$ reacts with certain oxides to form metallic sulphates thereof, and whereby the sulphates react with sulphides to form metallic oxides and sulphur dioxide which metallic oxides and dioxide are again converted into sulphates and trioxide, and introducing $SO_3$ gas sufficient to maintain a concentration thereof to prevent decomposition of the sulphates.

15. A process for desulphurizing sulphide minerals containing iron comprising roasting the same with air for the formation of metallic oxides including ferric oxide and sulphur oxides, whereby the ferric oxide acts catalytically to form $SO_3$ from the liberated $SO_2$ and oxygen of the air, whereby the $SO_3$ reacts with certain oxides to form metallic sulphates thereof, and whereby the sulphates react with sulphides to form metallic oxides and sulphur dioxide which metallic oxides and dioxide are again converted into sulphates and trioxide, introducing $SO_3$ gas sufficient to maintain a concentration thereof to prevent decomposition of the sulphates, removing the sulphates from said gases and heating the sulphates in an atmosphere low in $SO_3$ to decompose the sulphates, form oxides and liberate $SO_3$, and introducing said $SO_3$ to the sulphide minerals being roasted and resulting oxides to accelerate the oxidation of the sulphides by formation of sulphates.

16. A process for desulphurizing sulphide minerals comprising roasting the same with air for the formation of metallic oxides and sulphur oxides under conditions favorable to the efficient formation of sulphates, whereby the sulphates react with sulphides to form metallic oxides and sulphur dioxide which metallic oxides are again converted into sulphates by $SO_3$ present, introducing $SO_3$ gas sufficient to maintain a concentration thereof to prevent decomposition of the sulphates, removing the sulphates from said gases and heating the sulphates in an atmosphere low in $SO_3$ to decompose the sulphates, form oxides and liberate $SO_3$, and introducing said $SO_3$ to the sulphide minerals being roasted and the resulting oxides to accelerate the oxidation of the sulphides by formation of sulphates.

17. A process for treating sulphide minerals comprising roasting the same with air for formation of metallic oxides and sulphur oxides under conditions favorable to the efficient formation of sulphates, whereby the sulphates react with sulphides to form metallic oxides and sulphur dioxide which metallic oxides are again converted into sulphates by $SO_3$ present, and introducing $SO_3$ gas sufficient to maintain a concentration thereof to prevent decomposition of the sulphates.

18. A process of desulphurizing metal sulphide material which comprises causing sulphide material containing iron and other sulphides to travel through a furnace while subjecting the same to extraneous heating, passing gases containing sulphur trioxid and free oxygen, in concurrent contact with the ore during the first stage of the said furnace treatment, continuing the heating of the sulphatized material while passing through the later stage of the process, while rapidly withdrawing the evolved gases containing sulphur trioxid from said later stage of the process, withdrawing the gases from said first stage at near the end thereof, and conducting the gases evolved in the second stage into the first stage for utilization as a sulphatizing agent therein.

In testimony whereof we affix our signatures.

MELVILLE FULLER COOLBAUGH.
JOHN BURNS READ.